Sept. 23, 1958 P. C. KNIGHT 2,853,542

TELEGRAPH CONTROL CIRCUIT

Filed Aug. 17, 1954 2 Sheets-Sheet 1

INVENTOR.
Preston C. Knight
BY Charles H. Brown
ATTORNEY

Sept. 23, 1958 P. C. KNIGHT 2,853,542

TELEGRAPH CONTROL CIRCUIT

Filed Aug. 17, 1954 2 Sheets-Sheet 2

INVENTOR.
Preston C. Knight
BY Charles H. Brown
ATTORNEY

United States Patent Office 2,853,542

Patented Sept. 23, 1958

2,853,542

TELEGRAPH CONTROL CIRCUIT

Preston Conway Knight, New York, N. Y., assignor to Radio Corporation of America, a corporation of Delaware Application August 17, 1954, Serial No. 450,372

The terminal fifteen years of the term of the patent to be granted has been disclaimed 6 Claims. (Cl. 178—2)

Figure 1:
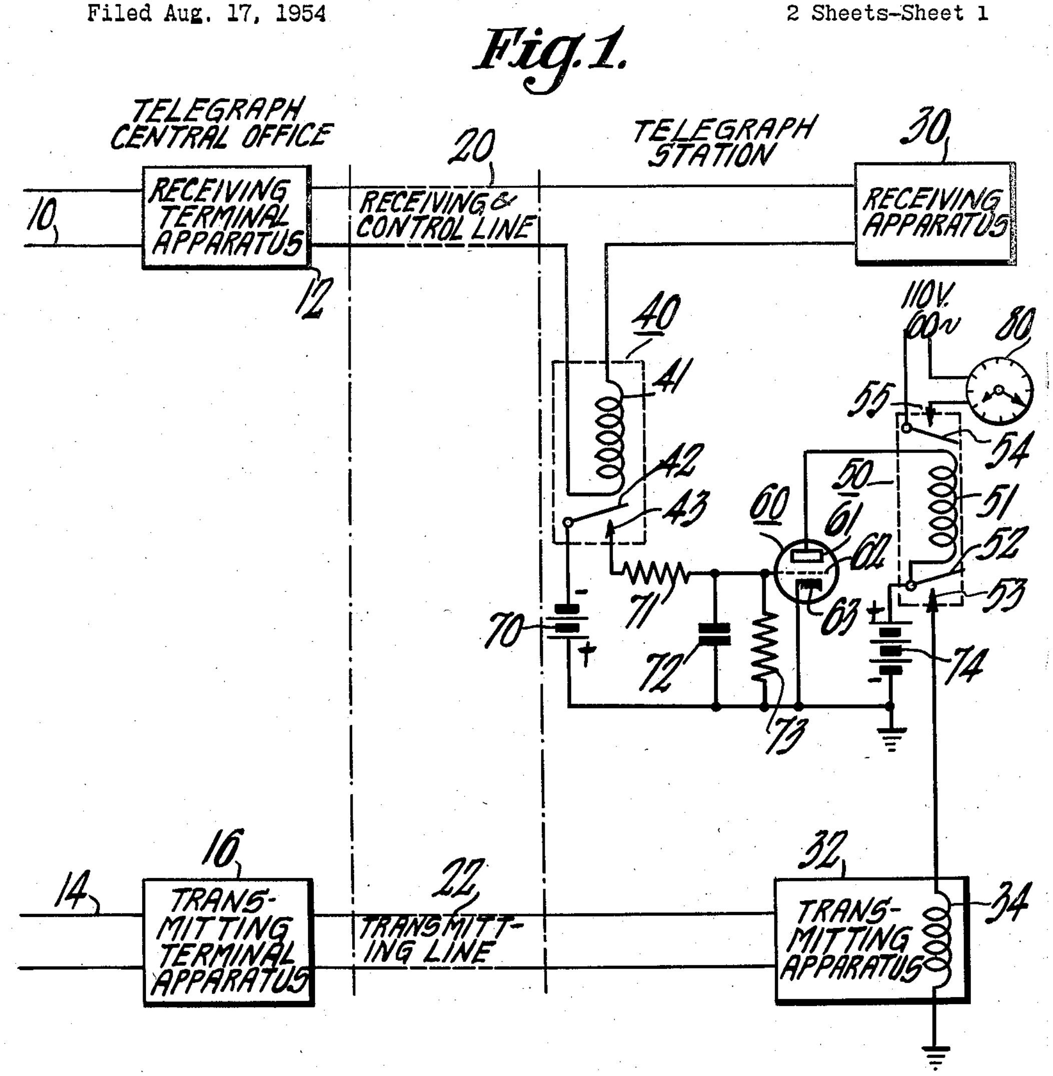

The invention relates to control circuits for telegraph systems, and particularly to control circuits utilizing the existing transmission lines between a telegraph station and a telegraph central office.

Telegraph communication circuits, particularly two-way radio-telegraph communication circuits between central offices, are usually terminated at central offices which provide terminal apparatus for the communication circuits. A telegraph station, such as a customer's office remote from the central office, is connected to one of the communication circuits by transmission lines for transmitting and receiving messages. The portion of the communication circuit for transmitting messages from one central office to another central office may be, and often is, separate from and independent of the portion of the communication circuit for receiving messages at the one central office from the other central office. Thus, conditions of the communication circuit may be such that messages are being transmitted or can be transmitted from the telegraph station and, at the same time, it is impossible for the telegraph station to receive messages over the communication circuit. Or, the conditions of the communication circuit may be such that messages cannot be transmitted from the telegraph station and, at the same time, it is possible for the telegraph station to receive messages over the communication circuit. At certain telegraph stations, it is desirable for purposes of indication or control to know the condition of the communication circuit over which the telegraph statoin receives its messages. Further, it is desirable to know this condition at all times. Generally, this condition is known at the central office. Normally there are two transmission lines (or land lines) between the telegraph station and the central office. One transmission line carries messages from the central office to the telegraph station and the other transmission line carries messages in the reverse direction. In order to indicate at the telegraph station the condition of the communication circuit, a control circuit employing a third transmission line between the radio-telegraph station and the central office has previously been necessary. Such a third transmission line uses additional facilities which are expensive and often difficult to obtain.

An object of the invention is to provide a control circuit for telegraph stations for indicating at the telegraph station the condition of a communication circuit and which utilizes the exsting facilties between such stations and central offices.

Another object of the invention is to provide a control circuit for telegraph stations for enabling the transmitting apparatus at the telegraph stations when messages are being received or can be received over the communication circuits, and for disabling the transmission apparatus at the telegraph stations when messages cannot be received over the communication circuit.

The invention provides a control circuit for a telegraph station, such as a customer's office, which has receiving apparatus, and may have transmitting apparatus, and which is located at a point remote from a telegraph central office. At the central office, terminal apparatus is provided for the various communication circuits which couple together different central offices. A receiving transmission line extends between the central office and the telegraph station at a customer's office and connects one of the receiving communication circuits to the receiving apparatus at the telegraph station for transmitting messages received over the receiving communication circuit by the central office to the telegraph station. According to the invention, the receiving line extending to the telegraph station also serves as the control circuit transmission line as well. Associated with the terminal equipment at the central office is apparatus for applying idle signals on the receiving transmission line to indicate to the customer that the communication circuit serving that customer, although idle, is able to carry messages, and for applying a control signal on the receiving line to indicate that the communication circuit is unable to carry messages. At the telegraph station, the idle signals are used either to indicate to the customer that the communication circuit is able to carry messages, but is momentarily idle, or they are used to enable the transmitting apparatus at the telegraph station. Likewise, the control signal is used to either indicate to the customer that the communication circuit is unable to carry messages, or it is used to disable transmitting apparatus at the customer's telegraph station, or both.

Figure 2:
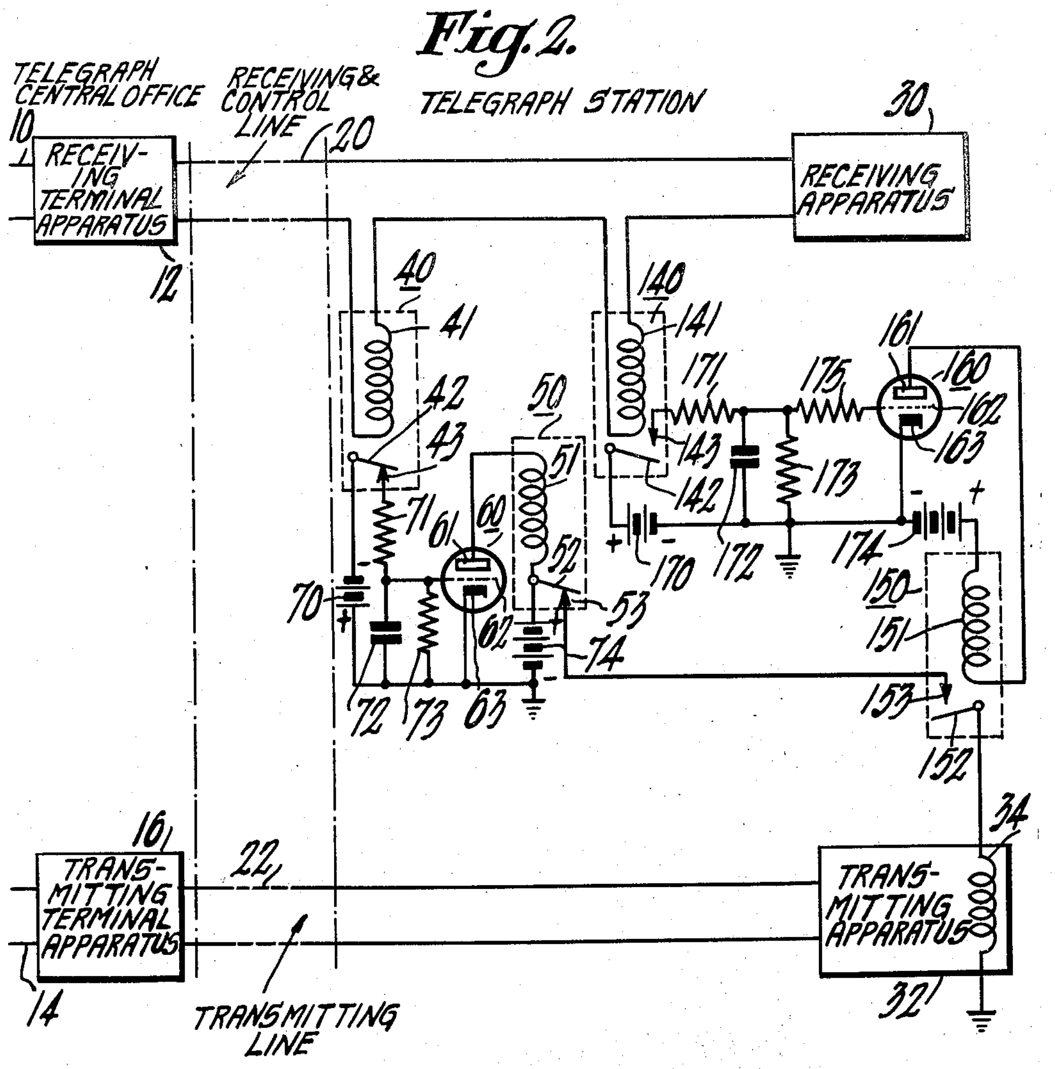

The invention is described in detail in the following description with reference to the accompanying drawing, in which:

Figs. 1 and 2 show two different embodiments of the control circuit of the invention as utilized in a telegraph system.

In Fig. 1, a telegraph central office is shown with a radio communication circuit 10, receiving terminal apparatus 12, a radio communication circuit 14, and transmitting terminal apparatus 16, the theory and operation of which are known in the art. An example of such apparatus may be found in Patent No. 2,653,996 issued to Wright on September 29, 1953, and entitled "Electric Telegraph System." The radio communication circuits 10 and 14 extend between central offices. While the operation of the terminal apparatus 12, 16 may vary, its purpose in this embodiment is to convert 7-unit telegraph signals, being received over the radio communication circuit 10 to 5-unit telegraph signals and to convert 5-unit telegraph signals, being transmitted over the radio communication circuit 14, to 7-unit telegraph signals. In the embodiment shown, 5-unit 60 words per minute, called 60 speed, message characters are assumed for use on land lines, such characters having a total signal length of 163 milliseconds. However, if different unit codes or speeds are to be used, the invention can still be used. In addition to converting the 7-unit radio telegraph signals to 5-unit telegraph signals, however, the receiving terminal apparatus 12 is arranged to apply idle signals on a receiving and control land transmission line 20 in the absence of messages or intelligence being carried by the communication circuit 10 associated with the particular receiving and control line 20. The line 20 extends from the central office to a remote customer's telegraph station. Provision is also made to apply a control signal on the receiving and control line 20 when the communication circuit 10 associated with the particular receiving and control line 20 is unable to carry messages or intelligence for some reason, such as atmospheric conditions.

A remote telegraph station, such as a customer's office, is connected to the telegraph central office by the receiving and control land line 20 and by a transmitting land line 22. The receiving and control line 20 connects to receiving apparatus 30 at the telegraph station, which is usually a teletypewriter printer. The transmitting line 22 connects to transmitting apparatus at the telegraph station, which is usually a teletypewriter keyboard or a combination teletypewriter keyboard and a tape distributor. In both Fig. 1 and Fig. 2, the transmitting apparatus 32 includes a release magnet 34 which must be energized before the transmitting apparatus 32 is able to transmit on the transmitting line 22.

In Fig. 1, the control circuit is connected to the receiving and control line 20 by a relay 40. The winding 41 of the relay 40 is serially connected into the receiving and control line 20 so that any current flowing in the receiving and control line 20 also flows through the winding 41. The armature 42 of the relay 40 is normally released and in engagement with a contact 43. When current flows in the winding 41, however, the armature 42 is pulled up or operated and the engagement between the armature 42 and the contact 43 is broken.

The contact 43 is connected through a resistor 71 to the control grid 62 of an electron discharge tube 60 having an anode 61, a control grid 62, and a cathode 63. The armature 42 is connected to the negative terminal of a source of D.-C. potential 70 which renders the tube 60 cut off. The positive terminal of the source of D.-C. potential 70 is connected to some point of reference potential, such as ground. A capacitor 72 and resistor 73, of such values as to hold the tube 60 cut off for approximately 165 milliseconds, are connected in parallel between the control grid 62 and the point of reference potential. The cathode 63, which may be heated in the conventional way, is also connected to the point of reference potential.

The anode 61 of the tube 60 is connected through the winding 51 of a relay 50 to the positive terminal of a source of D.-C. potential 74. The negative terminal of the source of D.-C. potential 74 is connected to the point of reference potential. The armature 52 is also connected to the positive terminal of the source of D.-C. potential 74 and is normally released and in engagement with a contact 53. Likewise, the armature 54 is connected to one terminal of a 110 volt 60 cycle power source and is normally released and in engagement with a contact 55. When current flows in the winding 51, however, the armatures 52 and 54 are operated and the connections between the armature 52 and the contact 53, and between the armature 54 and the contact 55, are broken.

The contact 53 is shown connected to a release magnet 34 of the transmitting apparatus 32 and the contact 55 is shown connected to an indicator clock 80. These connections are shown by way of example only, for it is possible to connect the contacts to other devices as well, or to only one such device, depending on the indication or result desired.

In Fig. 1, the armatures 42, 52, and 54 are shown in the position for a control signal on the receiving and control line 20. As explained, such a control signal indicates that one of the communication circuits 10, 14 is unable to carry messages. This control signal may be a steady mark signal, which causes current to flow in the receiving and control line 20 and which causes the receiving apparatus to remain idle. This current flows through and energizes the winding 41 of the relay 40, thus operating the armature 42 to break its contact with the contact 43.

Before the current flow caused by the control signal operated the armature 42, the source of D.-C. potential 70 was connected through the armature 42 and the contact 43 to the capacitor 72. The capacitor 72 was charged so that a negative voltage, determined by the resistors 71 and 73, appeared on the grid 62 of the tube 60 and held the tube 60 cut off. But if the current flow caused by the steady mark signal, and which energizes the relay winding 41, is sufficiently long, the charge on the capacitor 72 will leak off through the resistor 73, and the grid 62 will become sufficiently positive to allow current to flow in the tube 60. It should be noted that the desired time required for the capacitor 72 to lose enough charge so that the tube 60 can conduct is approximately 165 milliseconds. Since the mark portions of 5-unit 60 speed message characters do not total more than 141 milliseconds, the possibility of confusing the steady control signal with a message character having all mark pulses is eliminated.

When current flows through the tube 60, the relay 50 is energized and operates the armatures 52 and 54, which are normally released and in contact with the contacts 53 and 55 respectively. This operation breaks the contacts between the armature 52 and the contact 53 and between the armature 54 and the contact 55. Thus, no current flows from the source of D.-C. potential 74 through the armature 52 and the contact 53 to the release magnet 34, or from the 110 v. 60∼ source through the armature 54 and the contact 55 to the indicator clock 80. With no current flowing through the release magnet 34, the transmitting apparatus 32 is disabled. Likewise, with no current flowing through the indicator clock 80, the time that the communication circuit is unable to carry messages may be determined.

When the control signal is removed from the receiving line 20, messages or idle signals are applied to the receiving line 20 at the telegraph central office. As explained, the idle signals are applied on the receiving line 20 in the absence of messages when the communication circuit is able to carry such messages. While the receiving apparatus 30 responds to an idle signal, it performs no function. During messages, or idle signals, the start signal, which is 22 milliseconds space for 5-unit 60 speed characters and corresponds to the absence of voltage on the line, will de-energize the relay 40 as a result of which the armature 42 of the relay 40 will be released to allow the source of D.-C. potential 70 to be connected to the capacitor 72. Thus, the capacitor 72 does not completely discharge, the tube 60 does not conduct, and the armatures 52 and 54 are in the released or unoperated condition during messages or idle signals. When the armatures 52 and 54 are unoperated, they remain in engagement with the contact 53 and 55 respectively, and current flows through the release magnet 34 and the indicator clock 80. With current flowing through the release magnet 34, the transmitting apparatus 32 is enabled. Likewise, with current flowing through the indicator clock 80, the time that the communication circuit is carrying messages or is idle but able to carry messages, may be indicated.

Although the relay 50 is shown with two armatures 52 and 54, and two contacts 53 and 55, it is possible to use a different type relay having only one armature and contact, or a separate winding with its own armature and contact.

While the control circuit of Fig. 1 will give the desired indication or actuation when messages, idle signals, and a control signal are being received at the telegraph station, it will not give the desired indication in the absence of any signals received at the telegraph station. Such a situation might arise if the receiving and control line 20 were opened through accident. In such a case, the armature 42 would be released, the tube 60 would be cut off, the armatures 52 and 54 would be released, and the release magnet 34 and the indicator clock 80 would still be energized.

In order to indicate such a situation, the control circuit shown in Fig. 2 is provided. The control circuit of Fig. 2 has an additional circuit added to the circuit of Fig. 1. Identical parts of the two circuits have been given the same reference numerals.

The additional circuit of Fig. 2 comprises a relay 140, an electron discharge tube 160, and a second relay 150. The winding 141 of the relay 140 is serially connected into the receiving and control line 20. The connections for the two circuits are identical, with a few exceptions. The armature 142, which is normally released, only engages the contact 143 when the winding 141 is energized. When the winding 141 is energized, the positive terminal of a source of D.-C. potential 170 is connected to the control grid 162 of the tube 160 through resistors 171 and 175 so that the tube 160 may conduct. A resistor 173 and a capacitor 172, of such values as to hold the tube 160 conducting for approximately 165 milliseconds, are connected in parallel between the control grid 162 and the point of reference potential. The resistor 171 is connected between the contact 143 and the capacitor 172 to control the rate at which the capacitor 172 is charged. The resistor 175 is connected between the resistor 173 and the control grid 162 to insure that the capacitor 172 will receive the needed positive charge from the source of D.-C. potential 70. The anode 161 is connected through the winding 151 of the relay 150 to the positive terminal of a source of D.-C. potential 174. The armature 152, which is normally released, engages a contact 153 when the winding 151 is energized. The armature 152 is connected to the release magnet 34. It may also be connected to an indicator device, such as the indicator clock 80 shown in Fig. 1. The contact 53 of the relay 50 is connected to the contact 153 of the relay 150, instead of to the actuator or indicator device. The other armature 54 and contact 55, shown in Fig. 1, are omitted in Fig. 2.

In Fig. 2, the armatures of all relays are shown in the position for the absence of any signals on the receiving line and control line 20. Under such conditions, the armature 42 is released, the tube 60 is cut off and the armature 52 is released. If the contact 53 were connected to the release magnet 34, the transmitting apparatus 32 would be enabled. However, in the other portion of the control circuit, the armature 142 is released, and because the capacitor 172 has lost its positive charge, the tube 160 is cut off, and the armature 152 is released. In this way the release magnet 34 is de-energized to disable the transmitting apparatus 32.

When messages or idle signals are applied to the receiving and control line 20, each stop signal, which is 33 milliseconds mark for 5-unit 60 speed characters and corresponds to the presence of voltage on the line, results in the armature 142 engaging the contact 143 to keep recharging the capacitor 172 positively. Since there is insufficient time between these rechargings for this positive charge to leak off, the tube 160 is kept conducting and the relay 150 is kept energized, thus keeping the contact 153 and the armature 152 engaged. Also, during messages or idle signals, each start signal, which is 22 milliseconds space for 5-unit 60 speed characters and corresponds to the absence of voltage on the line, results in the armature 42 engaging the contact 43 to keep recharging the capacitor 72 negatively. Since there is insufficient time between these rechargings for this negative charge to leak off, the tube 60 is kept cut off and the relay 50 is kept de-energized, thus keeping the contact 53 and the armature 52 engaged. With the armature 52 released and the armature 152 operated, the release magnet 34 is energized to enable the transmitting apparatus 32.

When a control signal is applied to the receiving and control line 20, the relay 40 is energized, thus disengaging the contact 43 and the armature 42 and removing the negative bias from the grid 62 of the tube 60. This allows the tube 60 to conduct, thus energizing the relay 50. When the relay 50 is energized, the contact 53 and the armature 52 become disengaged. In this way, the release magnet 34 is de-energized to disable the transmitting apparatus 32.

What is claimed is:

1. A control circuit for a telegraph station having transmitting apparatus remote from a telegraph central office having terminal apparatus for communication circuits, comprising a transmission line connecting said terminal apparatus to said telegraph station for the transmission of messages from said central office to said telegraph station, means at said central office for applying idle signals to said transmission line in the absence of said messages to said transmission line, means at said central office for applying a control signal to said transmission line to indicate that said communication circuit is unable to carry said messages, and means at said telegraph station coupled to said transmission line to enable said transmitting apparatus in response to the presence of said messages and said idle signals on said transmission line, and to disable said transmitting apparatus in response to the presence of said control signal on said transmission line.

2. A control circuit for a telegraph station having transmitting apparatus remote from a telegraph central office having terminal apparatus for communication circuits, comprising a transmission line connecting said terminal apparatus to said telegraph station for the transmission of messages from said central office to said telegraph station, means at said central office for applying idle signals to said transmission line in the absence of said messages on said transmission line, means at said central office for applying a control signal of a nature different from said idle signals and from said messages to said transmission line to indicate that said communication circuit is unable to carry said messages, and means at said telegraph station coupled to said transmission line to enable said transmitting apparatus in response to the presence of said messages and said idle signals on said transmission line, and to disable said transmitting apparatus in response to the presence of said control signal and in response to the absence of any signals on said transmission line.

3. A control circuit for a telegraph system, comprising a telegraph station having transmitting and receiving apparatus, a remote telegraph central office having terminal apparatus for communication circuits to another central office, a transmission line connecting one of said communication circuits to said telegraph station receiving apparatus for the transmission of messages from said communication circuit to said telegraph station, means at said central office associated with said terminal apparatus for applying idle signals to said transmission line in the absence of said messages on said transmission line, means at said central office associated with said terminal apparatus for applying a control signal to said transmission line to indicate that said communication circuit is unable to carry said messages, and means at said telegraph station coupled to said transmission line to enable said transmitting apparatus in response to the presence of said messages and said idle signals on said transmission line, and to disable said transmitting apparatus in response to the absence of any signals and in response to the presence of said control signal on said transmission line.

4. A control circuit for a telegraph system, comprising a telegraph station having transmitting and receiving apparatus, a remote telegraph central office having terminal apparatus for radiotelegraph communication circuits, to another central office, a transmission line connecting one of said radiotelegraph circuits to said telegraph station receiving apparatus for the transmission of messages from said radiotelegraph circuit to said telegraph station, means at said central office associated with said terminal apparatus for applying idle signals to said transmission line in the absence of said messages on said transmission line and to which said receiving apparatus responds but performs no function, means at said central office associated with said terminal apparatus for applying a control signal to said transmission line to indicate that said radio telegraph circuit is unable to carry said messages and to which said receiving apparatus does not respond, and means at said telegraph station coupled to said transmission line to enable said transmitting apparatus in response to the presence of said messages and said idle signals on said transmission line, and to disable said transmitting apparatus after a predetermined length of time following the absence of any signals and following the presence of said control signal on said transmission line.

5. A control circuit for a telegraph system, comprising a central office having terminal apparatus for radio-telegraph communications circuits, a remote telegraph station having transmitting and receiving apparatus thereat, a transmission line connecting the terminal apparatus of one of said communication circuits to said telegraph station receiving apparatus for the transmission of messages from said one communication circuit to said telegraph station, means at said central office associated with said terminal apparatus for applying idle signals to said transmission line in the absence of messages and to which said receiving apparatus responds, means at said central office associated with said terminal apparatus for applying a steady mark control signal to said transmission line of a nature to which said receiving apparatus does not respond, whereby the continued absence of response of said receiving apparatus serves to indicate that said communication circuit is unable to carry said messages, a relay at said telegraph station having a winding, an armature, and a contact normally engaging said armature, said winding being serially connected in said transmission line so that a current flowing in said transmission line due to the presence of a control signal energizes said relay and causes said armature to disengage said contact, and means connected to said armature and contact for enabling said transmitting apparatus in response to the engagement of said armature and contact and for disabling said transmitting apparatus in response to the disengagement of said armature and contact for a predetermined length of time.

6. A control circuit for a telegraph system, comprising a central office having terminal apparatus for radio-telegraph communications circuits, a remote telegraph station having transmitting and receiving apparatus thereat, a transmission line connecting the terminal apparatus of one of said communication circuits to said telegraph station receiving apparatus for the transmission of messages from said one communication circuit to said telegraph station, means at said central office associated with said terminal apparatus for applying idle signals to said transmission line in the absence of messages and to which said receiving apparatus responds, means at said central office associated with said terminal apparatus for applying a steady mark control signal to said transmission line of a nature to which said receiving apparatus does not respond, whereby the continued absence of response of said receiving apparatus serves to indicate that said communication circuit is unable to carry said messages, a first relay at said telgraph station having a winding, an armature, and a contact normally engaged with said armature, a second relay at said telegraph station having a winding, an armature, and a contact normally disengaged from said armature, said first relay winding being serially connected in said transmission line so that a current flowing in said transmission line due to the presence of a control signal energizes said first relay winding and causes said first relay armature to disengage said contact, said second relay winding being serially connected in its associated transmission line so that the absence of any current flowing in said transmission line deenergizes said second relay winding and causes said second relay armature to disengage its associated contact, and means connected to said armatures and contacts for enabling said transmitting apparatus in response to the engagement of said first and second relay armatures and contacts respectively, and for alternatively disabling said transmitting apparatus in response to the disengagement of said first relay armature and its associated contact for a predetermined length of time or for disabling said transmitting apparatus in response to the disengagement of said second relay armature and its associated contact for a predetermined length of time.

References Cited in the file of this patent

UNITED STATES PATENTS

| | | |
|---|---|---|
| 1,723,220 | Thorp | Aug. 6, 1929 |
| 1,749,048 | Thorp et al. | Mar. 4, 1930 |
| 2,465,507 | Bacon | Mar. 29, 1949 |
| 2,522,874 | Kahn | Sept. 19, 1950 |
| 2,713,085 | Walker | July 12, 1955 |